(12) United States Patent
Wood

(10) Patent No.: US 7,042,112 B2
(45) Date of Patent: May 9, 2006

(54) WAVE ENERGY CONVERSION SYSTEM

(75) Inventor: Charles Wood, Mississauga (CA)

(73) Assignee: Seawood Designs Inc., Kincardine (CA)

( * ) Notice: Subject to any disclaimer, the term of this patent is extended or adjusted under 35 U.S.C. 154(b) by 254 days.

(21) Appl. No.: 10/769,871

(22) Filed: Feb. 3, 2004

(65) Prior Publication Data

US 2005/0167988 A1    Aug. 4, 2005

(51) Int. Cl.
F03B 13/10 (2006.01)

(52) U.S. Cl. .............................. 290/53; 290/52; 290/43; 417/330; 417/331; 417/332

(58) Field of Classification Search .................. 290/53, 290/42, 54; 417/330, 331, 332
See application file for complete search history.

(56) References Cited

U.S. PATENT DOCUMENTS

| | | | |
|---|---|---|---|
| 4,103,494 A | 8/1978 | Tidwell | |
| 4,631,921 A | 12/1986 | Linderfelt | |
| 4,781,023 A | 11/1988 | Gordon | |
| 4,931,662 A | 6/1990 | Burton | |
| 6,020,653 A * | 2/2000 | Woodbridge et al. | 290/53 |
| 6,133,644 A | 10/2000 | Smith | |
| 6,229,225 B1 * | 5/2001 | Carrol | 290/53 |
| 6,647,716 B1 | 11/2003 | Boyd | |
| 6,768,217 B1 * | 7/2004 | Chalmers et al. | 290/53 |

* cited by examiner

Primary Examiner—Nicholas Ponomarenko
Assistant Examiner—Iraj A. Mohandesi

(57) ABSTRACT

An omni-directional system configured to convert the kinetic and potential energy in ocean waves to electrical energy or in some special cases to other forms of energy such as heat, mechanical and pressure energy. The system employs a float moored by a single hydraulic cylinder anchored to the seabed. Wave energy is captured as the float is displaced vertically and horizontally in response to wave action extending the hydraulic cylinder that in turn forces fluid under high pressure to the float where appropriate valves, hydraulic accumulators, and variable displacement hydraulic motors are arranged to drive electric generators. A secondary benefit of the system is the reduction of near shore erosion.

28 Claims, 4 Drawing Sheets

WAVE ENERGY CONVERSION SYSTEM

FIELD OF INVENTION

Systems designed to extract kinetic and potential energy from ocean waves and convert this energy to a form useful to mankind. The desired output of these systems is usually electrical energy but other outputs can be used in special circumstances such as mechanical energy for pumping and operating process equipment. Heat energy and pressure energy can also be valuable outputs.

BACKGROUND OF THE INVENTION

Mankind has realized for a very long time that ocean waves contain considerable amounts of energy that could be very useful if a means was available to harness it. In recent times, wave energy measurements have been undertaken by a number of countries. It has been found that a number of sites have an annual average wave energy flux approaching 70 kW per meter of wave crest. This level of energy concentration presents a very exciting opportunity to provide renewable "green" energy in very significant amounts. A mile of shoreline with an annual average energy flux 70 kW per meter of wave crest dissipates almost a billion kW hours of energy every year. If this energy is captured and converted to electrical energy at $0.10 per kW hour it would have a market value of $986 million. It is not reasonable to expect this ideal level of return, but a return in the order of 10% of this amount is still considerable at $98 million per year. The objective of this invention is to provide a means of converting as much as possible of the energy available in waves to electrical energy at a cost competitive with other existing energy sources.

Wave energy conversion systems must successfully operate in a very hostile environment and not succumb to violent storms and the deleterious impact of marine plant and animal life. Further, due to the location of the system offshore, finding a means of delivering the energy output to shore at a reasonable cost is also a demanding technical challenge. Even though the technical challenge is significant, one can be confident a suitable system can be developed if cost is not a constraint. The challenge is to provide an energy recovery system where the life cycle cost of energy delivered is economically viable when all costs and benefits are taken into account including pollution credits. This invention provides solutions that allow delivery of electrical and other forms of energy at economically viable cost levels.

A large number of wave energy recovery systems employing floats have been entertained and many patented in the past. They usually employ floats that are connected to mooring points via two or more mooring lines to ensure the float is not displaced any significant amount horizontally due to wave action. Further, the use of more than one mooring line can constrain a system to unidirectional operation limiting effective response of the system to a small angle of approach of oncoming waves. This disadvantage is overcome if the shape of the float in plan is essentially circular. This circular shape has some disadvantages that become more evident as the size of the float is increased. This invention makes use of a float that is generally cylindrical in shape with a single mooring connection permitting omni-directional operation without loss of performance. Further, the invention provides a means to take advantage of lateral motion of the float that results from the influence of ocean waves that is enhanced if the waves are breaking. This invention could effectively employ circular floats without detracting from system performance in some special circumstances related to site conditions.

Most float systems are targeted for installation well off shore that increases the cost of delivering energy to the shore and increases the cost of mooring because the water depth is greater. This invention recognizes these disadvantages in that it is configured for installation near shore (surf zone) in relatively shallow water. Energy recovery is also increased due to the steeper shape of waves in the surf zone. Shallow water mooring also reduces the risk of damage due to extreme storms in that shallower water tends to dissipate the energy of extremely large waves before they engage the float.

Providing a means to survive the extreme storm conditions at minimum system cost is very challenging. This invention deals with this problem by keeping the float at an elevation approximately level with the wave trough of storm waves allowing the uppermost high-energy portion of the wave to pass over the float. The float is designed to withstand the pressure of submergence created as the wave passes over the float. The storm control system has been given the ability to sense automatically the presence of extreme waves and place the system in a storm standby mode until a storm abates.

Float systems often convert float motion into energy by compressing air and in turn allow the compressed air to flow through an air turbine to convert the energy of compression to mechanical energy. This invention generates pressurized fluid that is directed to drive a variable displacement hydraulic motor (or motors) that in turn delivers mechanical energy to electrical generators or other mechanically driven devices. Heat can be generated directly from the pressurized fluid without the need to convert to mechanical energy by simply allowing the fluid to pass through restrictions. This invention preferably has the fluid energy conversion components located inside the float to minimize the distance hydraulic energy must be transmitted as extended transmission distances incur significant added cost and energy losses. Even though locating energy transformation components within the float is desirable in a number of instances, this invention can be configured to work with a remote and or shore based energy conversion components. One of the primary reasons for keeping the energy conversion components within the float is to facilitate removal of the complete system to a local service dock for maintenance without incurring the need to disconnect fluid conducting lines underwater and run the risk of polluting seawater and incurring the risk of seawater entering the fluid system.

Sea plant and animal life that grows on submerged system components is a serious maintenance issue that all wave energy conversion systems must contend. A successful energy conversion must address the problem by choosing appropriate materials and by providing a means to economically remove build-up of plant and animal life that degrades system performance as time passes.

Several means have been invented for the purpose of converting wave energy into electrical energy, and these seem to fall into the following broad categories;

A. "Rotational" Devices

Devices which directly, or at least early in the process, convert the oscillating motion of the waves into rotational energy, which is then generally used to directly turn a generator. Examples of this category of inventions include: Shoreline installations, such as:

i) Kumbatovic (U.S. Pat. No. 5,789,826, Aug. 4, 1998), which employs a flexible boom system to place a moveable turbine into the most active focal wave zone;

ii) Brown (U.S. Pat. No. 5,808,368, Sep. 15, 1998), which places floats at the end of long shore-based lever arms that pivot in response to the vertical motion of the floats in the waves;

iii) Buonome (U.S. Pat. No. 4,454,429, Jun. 12, 1984), which imposes a series of constrictions upon near-shore waters (which serve to amplify the wave action), and places floats between the constrictions, with lever arms on the shore in a manner reminiscent of Brown;

iv) Hidenori, et. al. (U.S. Pat. No. 5,027,000, Jun. 25, 1991), which uses the, rising and falling of water in open-bottomed cylinders placed near shore to mildly compress large volumes of air and drive an air turbine;

Near shore installations with foundations on the shore bottom, such as;

i) Eberla (U.S. Pat. No. 5,986,349, May 18, 1998; U.S. Pat. No. 4,206,601, Jun. 10, 1980), which utilizes a vertical pilaster and toroidal float surrounding the pilaster to pressurize air or a fluid as the float moves up and down relative to the pilaster;

ii) Youngblood (U.S. Pat. No. 5,359,229, Oct. 25, 1994), which employs a spherical float telescopically mounted to a secured vertical column, with a chain and counterweight, which turn a drive shaft as the float bobs;

iii) Borgren (U.S. Pat. No. 4,241,579, Dec. 30, 1980), wherein a central support grounded on the ocean floor supports a multiplicity of shafts on which are anchored floats that engage the shaft while bobbing, thereby translating the energy to rotational energy;

iv) Whitticar (U.S. Pat. No. 4,560,884, Dec. 24, 1985), which posits a stationary platform with a float connected to an air compressor, that delivers compressed air while bobbing;

Open ocean craft, platforms, or largely submerged devices (that also could be located near-shore if desired, or that do not specify a location), such as;

i) Russo (U.S. Pat. No. 4,803,839, Feb. 14, 1989), which mounts a float on a raft and achieves a certain amount of bobbing motion of the float relative to the raft, and mechanically converts this to rotational energy, driving a generator;

ii) Lamberti (U.S. Pat. No. 4,389,843, Jun. 26, 1983), which mounts floats on pivot arms from a boat, and using drive sprockets, gears, and clutches, converts this like-wise to rotational motion in a generator;

iii) Sieber (U.S. Pat. No. 5,394,695, Mar. 17, 1995), which posits an array of floats attached to piston-type pressurization units, connected in series to serially compress a fluid (gas or liquid) to a high pressure to then drive turbines and generators;

iv) Hyun (U.S. Pat. No. 5,854,516, Dec. 29, 1988) which employs a multiplicity of buoys suspended in an array in the ocean, where the bobbing motion of the buoys is converted to rotational energy, driving a liquid compression unit, and using the pressurized liquid to drive a turbine and generator;

v) Gordon (U.S. Pat. No. 4,781,023, Nov. 1, 1988), which employs a floating array of hinged floats whose motion relative to their support arms, or to their multiple segments, can drive a piston-type pressurizing device, producing "mechanical, hydraulic, or electrical power";

Most of the purely mechanical transducing devices suffer the limitation of unregulated rotational speed of the generator, rendering the output suitable only for non-critical current applications (usually the charging of batteries). To invert such output to a form suitable for the power grid requires an additional, inefficient step, rendering most of these devices impractical. Those that govern the rotational speed employing some kind of load control simply waste any energy produced in excess of the governed speed, again rendering them somewhat impractical.

The shoreline devices, additionally, are generally massive and ugly, and tend to disrupt the shoreline environment; and the near-shore inventions also pose some such additional visual and environmental problems.

The open ocean inventions that are boat-, raft-, or float-based will tend to dampen the surface waves because of their mass (as will those devices with large storage or generating facilities at or near the surface).

Those inventions that posit floats that are specially-designed or weighted, hinged, or otherwise encumbered are needlessly elaborate and generally more expensive than the within invention. In trying to optimize certain aspects of wave energy collection, their overall practicality is called into question. The floats of the within invention are simple, affordable, and responsive, being somewhat small relative to the wavelength of the average wave, and the overall simplicity of each power-producing module (if assembled into multiple arrays) allows easy maintenance, or module replacement, without taking the entire system down.

B. "Non-Rotational" Devices

These devices variously:

i) Use a pressure transducer on a surface below sea level to directly convert to electrical energy, which again is DC in nature and must be inverted to be applied to the power grid; and pressure transducers have expense considerations inherent within them as well (such as North, U.S. Pat. No. 5,955,790, Mar. 13, 1998);

ii) Collect ocean streaming energy, which is used to drive a turbine; but this suffers from uneven speed of flow (Williams, U.S. Pat. No. 5,592,816. Jan. 14, 1997);

iii) Contain a "slider" or other mass, on floating rails or in a floating cylinder, that moves back and forth when its support tips due to wave motion, and interacts with some means of pressurizing a fluid or driving a mechanism, a device which seems to suffer from frictional and inertial dissipation (such as Rubi, U.S. Pat. No. 4,851,704, Jul. 25, 1989 or Stupakis, U.S. Pat. No. 4,843,250, Jun. 27, 1989);

iv) Utilize wave action to move a permanent magnet past a coil and induce electrical current, which again would be sporadic in nature and suitable only for charging batteries or other electrical storage devices (as in Neuenschwander, U.S. Pat. No. 4,539,485, Sep. 3, 1985);

v) Employ a "liquid flywheel", or whirling vortex of water yielded from waves passing through a refractive horn and ramp, which drives a turbine; and again may produce energy in a pulsatile fashion (as in Wirt, U.S. Pat. No. 4,152,895, May 8, 1979).

SUMMARY OF INVENTION

A float that is basically a closed rectangular tube with rounded corners operates a hydraulic cylinder to pressurize a fluid that in turn is used to create heat, pump fluids, or more commonly, provide mechanical energy to operate equipment such as electrical generators. The rod of the hydraulic cylinder is attached to the float near the center of the float. The lower end of the hydraulic cylinder is anchored to the seabed. The hydraulic cylinder is the only mooring connection the float has with the seabed. The float is free to rotate in the plane of the surface of the sea and naturally tends to align its long axis parallel with the crest of incoming waves. The system is therefore omni-directional providing the ability to optimally extract energy from waves emanating from all directions. It may be advantages in some circumstances to angle the ends of the float to somewhat face oncoming waves to reinforce the natural tendency of the float to align itself parallel with wave crests. Other means such as fins (similar to the rudder on an airplane) can also be used to encourage the float to stay aligned with the wave crests if required.

Relative geometry of the installed system components and configuration of the components themselves are selected in a way to encourage the float to move horizontally (surf) as well as move upward due to the action of an oncoming wave. The surfing action improves the energy yield of the system. The system is designed to operate in the "surf zone" to take advantage of the system's ability to surf the steeper waves prevalent in the surf zone. A recovery force is applied to the float after each wave has passed to bring it back to the starting position before the next wave begins to build.

Special joints are required at the connection of the cylinder rod to the float and similarly at the connection of the lower end of the cylinder to the anchor in the seabed to give total freedom of rotation in all planes so that bending moments are not generated in the cylinder and cylinder rod. These connections can take the form of ball joints or universal joints.

Even though the foregoing system description discusses the connection of the cylinder rod to the float, the orientation of the cylinder could be reversed and the system could still be made to operate. The orientation of the hydraulic cylinder with the rod uppermost offers a unique advantage if the pressurized fluid oil is being delivered to the float as described in the preferred embodiment. With this arrangement the cylinder rod is made hollow and is used to make the hydraulic connection with the float without the use of flexible hose that is very expensive and bulky that in turn increases drag that is undesirable during the return of the float to the starting position. If the system is required to deliver pressurized fluid to some other location other than the float then a hollow cylinder rod connected to the seabed anchor could be advantageously used in this instance to deliver fluid to a fixed piping system.

The preferred embodiment makes use of a cylinder assembly directly connected to the float via a universal joint however it is anticipated that some sites could make use of a cylinder that is remote from the float and connected to the cylinder assembly via a cable or series of linkages.

Other arrangements for connecting the float to the cylinder can be used. For example, there may be advantages to using fixed or articulated links between the float and the cylinder (similar to lines usually associated with kites that connect to parts of a kite and converge to a single point where the kite line is attached) to provide some control/stability to the float.

A key feature of the system is that fluid energy conversion components and electrical generators maybe located inboard the float. This feature accommodates towing the complete system with all functioning parts to a remote weather protected maintenance depot by simply disconnecting the system from the fixed anchor. The connection to the fixed anchor can be configured to permit disconnection and reconnection without the use of a diver.

The system is designed for use in relatively shallow water from 30 to 150 feet deep. The specific depth selected is highly site dependent. Energy yield versus life cycle cost optimization is closely related to water depth. Determination of the optimum water depth for a particular site will evolve as costs and performance data become available as a result of full scale operating experience. The foregoing description of the cylinder link between the float and seabed anticipates a very shallow water installation. Deeper installations can make use of a cable connection between the lower end of the cylinder and the seabed. It is anticipated however, that a tubular extension connected to the lower end of the cylinder might be the most economical way to reach the anchor in deeper water. The tubular connection offers two advantages over a cable and may be also less expensive. It is desirable from a performance and towing perspective to give the combined cylinder and extension to the anchor as much buoyancy as possible. A tubular connection can be sized to provide the necessary buoyancy without added cost. The air chamber provided by a tubular connection advantageously reduces the change in air pressure below the piston in the cylinder as the piston moves in and out. Further, this generously sized chamber can act as a repository for pressurized fluid that works past the piston over millions of wave cycles. This oil would be drained from the tube during maintenance cycles and therefore not be allowed to contaminate the seawater.

The concept anticipates the risk of damage by extreme storms by automatically going into a "parked" or "standby" mode. In this mode the recovery force provided by the hydraulic cylinder is increased to keep the float at an elevation close to the trough of the waves so that the very high-energy wave crests pass over the top of the float. The system would not be producing energy in this mode. Floats would typically be designed for submergence to a 25 ft. depth to withstand the pressure of the waves passing over them.

A typical float could have a totally submerged displacement of 250,000 tons. Floats with this capacity move very large volumes of hydraulic fluid in short periods of time as the wave builds and crests (1–2 seconds). Fluid flow rates are therefore very high and large diameter expensive piping must be provided if high frictional flow losses are to be avoided. Minimization of the transport distance is therefore very important. Use of a hollow cylinder rod and locating all hydraulic components in the float minimize the length and cost of piping as well as the related frictional flow loses. Wave action provides short bursts of large amounts of energy as each wave passes. A portion of this energy has to be stored over short periods (until the next wave arrives in typically 8–14 seconds). Short-term energy storage can be provided by hydraulic-accumulators that compress gas. The energy can be withdrawn from the accumulator at a constant rate to generate a steady output from the system. An adaptive control system is employed that senses the amount of energy stored and the time of arrival of the next wave so it can meter the amount of energy delivered through a variable displacement hydraulic motor to an electrical generator or other device requiring the input of energy. The adaptive control system manages the release of stored energy in a way that only a small amount of energy is left in the accumulator when the next wave is encountered thereby ensuring there is energy storage capacity available for the next wave cycle.

This wave energy recovery system and embedded adaptive control has the capability to vary the resistance the hydraulic cylinder applies to the float as it is moved by action of the waves. This is accomplished by changing the minimum gas pressure in the high-pressure energy storage accumulator. In periods with low waves, the minimum gas pressure in the accumulator is kept low, typically 1,000 psi. As the height of the waves build, the minimum pressure in the accumulator is increased up to a maximum that typically may be as high as 3,000 psi. Optimum energy recovery requires the ability to change the amount of resistance the high pressure hydraulic accumulator applies to the float in that the energy recovery is a function of the resistance multiplied by the distance the float moves. For example, if the tension was kept at the maximum in a low wave period the float would not be able to overcome the resistance provided by the hydraulic cylinder and therefore would remain stationary. Energy would not be recovered in this instance because the distance moved would be zero.

One or more high pressure accumulators can be employed. Some cost and possibly weight savings can be realized by having a bank of accumulators and charging each with a different pressure such that hydraulic fluid enters them sequentially as the pressure of the incoming fluid rises.

Recovery of the float bringing it back to its starting position is accomplished by applying a low hydraulic pressure to the cylinder that causes the cylinder to pull on the float. A low pressure hydraulic accumulator located onboard the float is the source of low pressure fluid required by the recovery cycle. High winds will resist recovery however water flow on the back of the wave and gravity forces will assist with recovery therefore the required recovery force will be relatively small. Further, the horizontal recovery distance is small (in the order of 10 ft. for shallow water and in the order of 35 ft. in deep water). The adaptive control system adjusts the recovery tension (pressure) to suit conditions. For example, low waves usually equate to less lateral movement of the float and low wind levels that in turn requires less hydraulic cylinder tension to return the float to the starting position.

Wave energy is highly variable ranging from essentially zero for many hours per year to a relatively few hours at maximum output. The system output usually averages something less than half the peak output therefore it is advantageous to use two or more hydraulic motors each mated with its own electrical generator so that only one motor/generator set is operated most of the time. This practice reduces wear, extending component life and also improves the energy recovery efficiency in that only one generator is excited most of the time and the active hydraulic motor operates in a more efficient range.

BRIEF DESCRIPTION OF THE DRAWINGS

The apparatus of the invention will now be described with reference to the accompanying drawings, in which.

DETAILED DESCRIPTION OF THE INVENTION

In order to more clearly understand the present invention part numbers as assigned in the following parts list will be used:

| Part Number | Description |
| --- | --- |
| 1 | Float |
| 2 | Hydraulic Cylinder Assembly |
| 3 | Flexible Joint at Float |
| 4 | Flexible Joint at Seabed |
| 5 | Seabed Anchor |
| 6 | Seabed |
| 21 | Barrel |
| 22 | Hollow Cylinder Rod |
| 23 | Piston |
| 24 | Extension Tube |
| 25 | Hydraulic Fluid |
| 26 | Ports |
| 71 | Hydraulic Accumulator |
| 72 | Check Valve |
| 73 | Adaptive Control |
| 74 | Variable Displacement Motor |
| 75 | Electric Generator |
| 76 | Fluid Cooler |
| 80 | Low Pressure Hydraulic Accumulator |
| 81 | Check Valve |
| 82 | Fluid Reservoir |
| 83 | Small Pump |
| 84/85 | Shut Off Valves |
| 90 | Float Ends |

Figure 1:
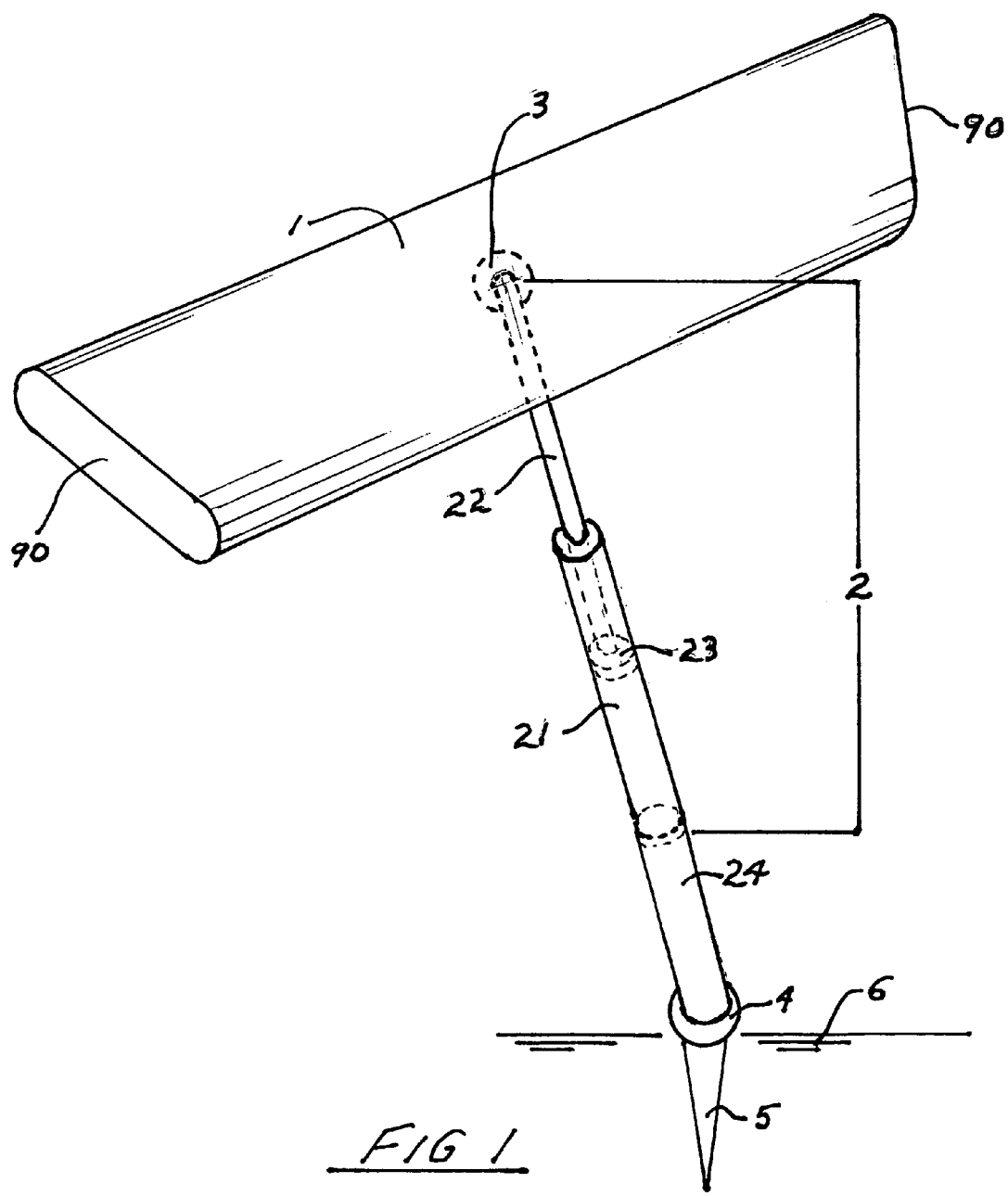
FIG. 1 is a perspective view of a configuration of a typical float with a hydraulic cylinder attached at the center of the long axis of the float. The hydraulic cylinder is shown with and extension on its lower end.
Figure 2:
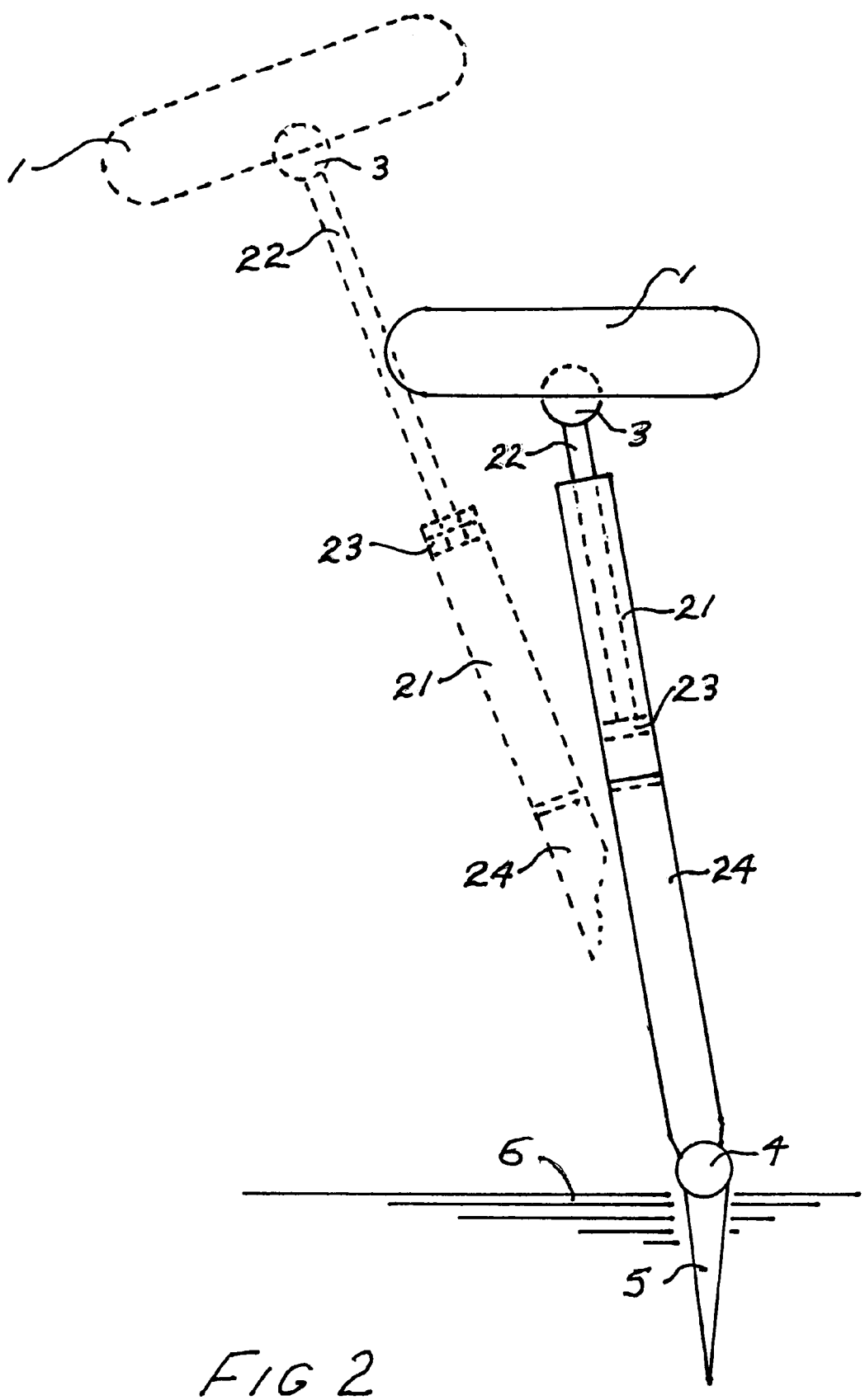
FIG. 2 is an elevation view on the end of the float in the trough of a wave with the hydraulic cylinder attached. A phantom outline shows the position the float on the crest of a wave with the corresponding extension of the hydraulic cylinder. A tubular extension on the lower end of the hydraulic cylinder is also shown.
Figure 3:
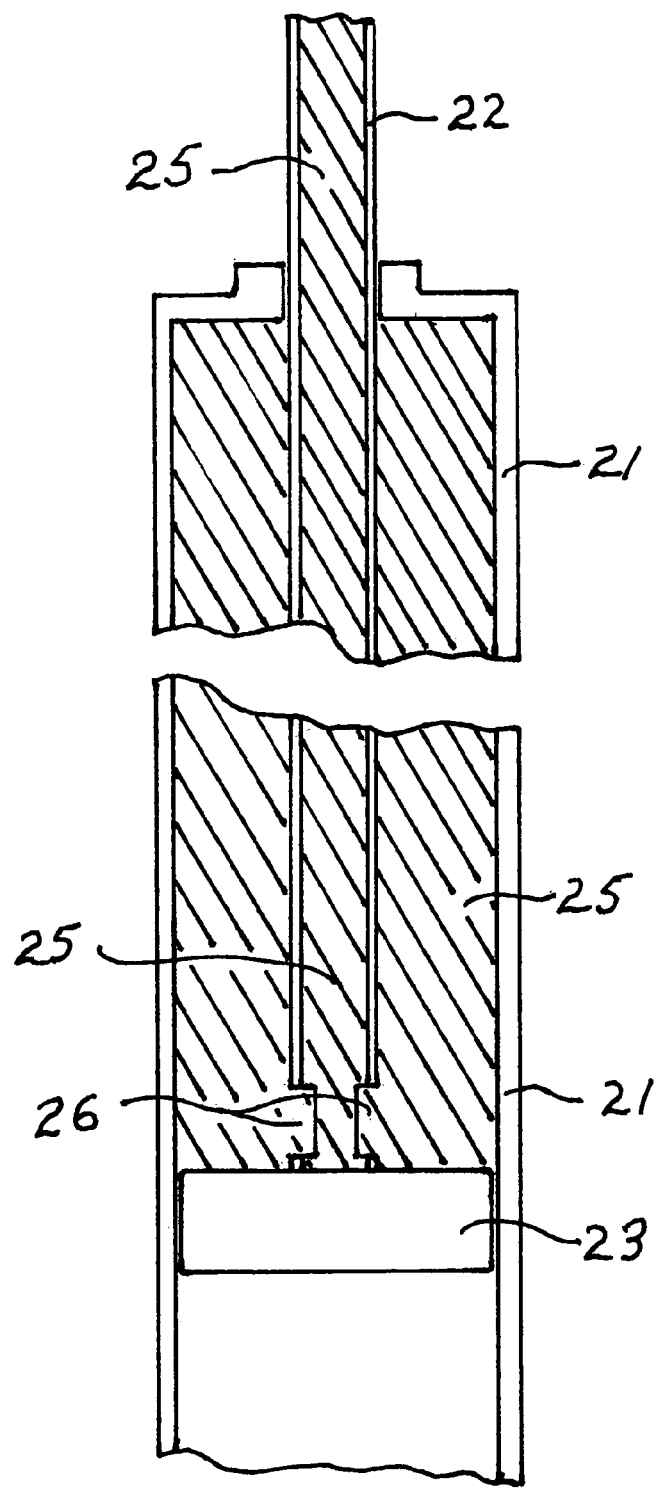
FIG. 3 is a sectional view of the hollow cylinder rod showing elongated ports in the rod immediately above the cylinder piston that allow hydraulic oil to enter the rod and move upward to the float as the float moves the piston upward.
Figure 4:
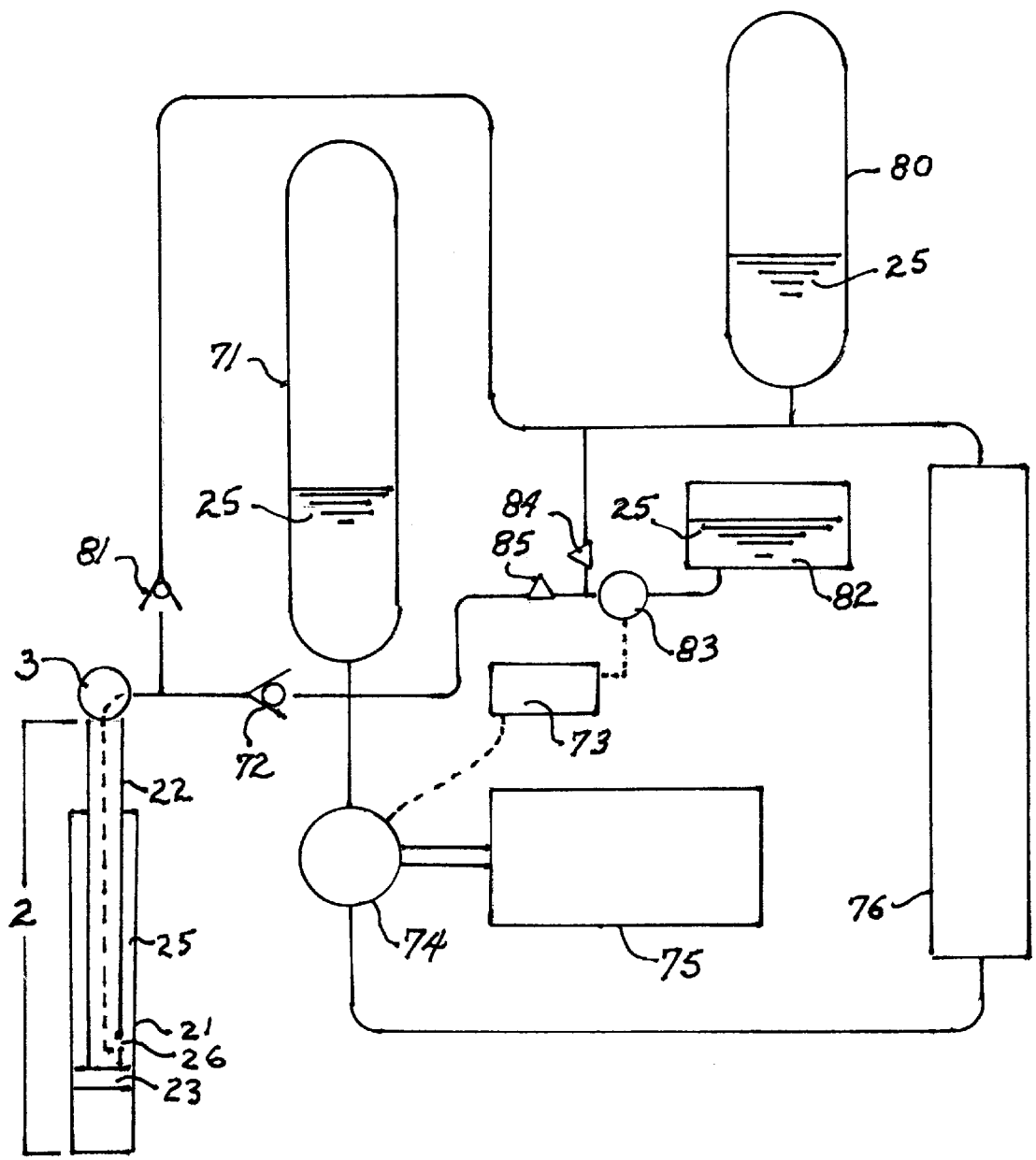
FIG. 4 is a hydraulic schematic showing all of the components installed inside the float with the exception of the hydraulic cylinder that is external to the float.

A large float 1 as shown in FIG. 1 designed to be as light as possible and still withstand the crushing pressures associated with submergence to a substantial depth that typically might be 25 feet or more. The ends 90 of the float are angled to face oncoming waves.

A hydraulic cylinder assembly 2 is attached near the center of the float by means of a flexible joint 3 designed to withstand high tensile loads and is made with hollow components that are configured to conduct pressurized fluid from the hollow cylinder rod 22 up to the float 1 above. The flexible joint 3 is attached to the float 1 at a position that is a little forward of the longitudinal float axis and below the bottom of the float. Optimum positioning of the point of connection ensures the float is not overturned in high cresting waves, but instead is encouraged to dive into abnormally extremely high waves so that the top of the wave passes over the float. A further consideration in selecting the attachment position is the need to rotate the attached hydraulic cylinder assembly 2 into a generally horizontal position when the complete wave energy conversion system is towed to port for servicing.

The hydraulic cylinder assembly 2 is comprised of a barrel 21, a hollow rod 22, a piston 23, and an extension tube 24. The maximum stroke of the cylinder is typically limited to 12 to 16 feet depending on the water depth and wave regime at a particular site. The length of large hydraulic cylinders are usually a foot or two longer than the maximum stroke therefore the length of the extension tube 24 is considerable as it must bridge the distance from the bottom end of the cylinder barrel 21 to the flexible joint 4 that is attached to the seabed anchor 5.

A flexible joint 4 is used to connect the hydraulic cylinder assembly 2 to an anchor 5 in the seabed 6. This flexible joint 4 can be the form of ball joint or universal joint to give the float 1 and connected cylinder assembly 2 an ability to align with waves oncoming from all directions.

When wave action moves the float 1 away from a position generally above the seabed anchor 5 the rod 22 and attached piston 23 are forced upward that in turn forces fluid 25 up to the float 1 under significant pressure through ports 26 in the hollow rod 22, up rod 22 and through the flexible joint 3.

Hydraulic fluid 25 is received in the float 1 by a high pressure hydraulic accumulator 71 after passing through a check valve 72 positioned to allow free flow to the high pressure accumulator 71 but prohibits reverse flow to the cylinder assembly 2.

Adaptive control 73 recognizes when the pressure in the accumulator 71 has peaked at which time the adaptive control gives an appropriate signal to variable displacement motor 74 to operate, drawing pressurized fluid from accumulator 71 at a variable rate to maintain an essentially constant torque on the electrical generator 75 at a sufficient rate so that all pressurized fluid is drained from the accumulator 71 at the moment fluid 25 starts to flow into the accumulator 71 as a result of float 1 response to the next oncoming wave.

Electrical generator 75 is preferably an asynchronous generator (simply a standard induction motor) but other types of electrical generators can be employed. The advantage of an asynchronous generator is that it automatically synchronizes with the electrical power grid when it is connected without the need for very expensive synchronizing switchgear. Further, it can run as a motor without load and instantly deliver electrical energy to the electrical power grid the moment the hydraulic motor 74 starts to apply a torque without the need to activate and synchronize switchgear.

Fluid 25 discharges from the hydraulic motor 74 to a fluid cooler 76 that cools the fluid that tends to heat up quickly due to the relatively small volume involved and the extensive amount of energy it is transporting. Preferably, the cooler 76, is an integral part of the bottom surface of the float 1 so that heat is transferred directly to seawater eliminating the need for seawater circulating pumps and the need to clean internal surfaces of ocean plant and animal life that would likely take up residence and interfere with heat transfer.

Fluid 25 is discharged at low pressure from the fluid cooler 76 to a low pressure hydraulic accumulator 80 and simultaneously to a check valve 81 aligned to permit free fluid flow to the cylinder assembly 2 but not allow reversing the flow back to the low pressure accumulator 80 when high pressure oil is being delivered by action to the hydraulic cylinder assembly 2 as the float 1 encounters an oncoming wave. As soon as the float 1 reaches its maximum displacement with respect to the anchor 5 the pressure falls in fluid 25 to that of the low pressure accumulator 80. The low pressure accumulator maintains fluid pressure on piston 23 that in turn creates tension in rod 22 to take the float 1 back to its starting position ready for the next wave induced power cycle to begin anew.

A fluid reservoir 82 is connected to the primary fluid circuit via a small pump 83 and two shut-off valves 84 and 85. This secondary circuit is used to adjust the basic charge pressure of both the high pressure accumulator 71 and low pressure accumulator 80 by actuation of the appropriate valve 84 or 85 and adding or removing fluid from the accumulator requiring adjustment of its operating pressure. "Parking" the float 1 under extreme storm conditions is accomplished by opening valve 85 and via pump 83 to increase the fluid pressure between the cylinder assembly 2, motor 74 and high pressure accumulator 71 to a sufficiently high level that the float 1 does not have sufficient buoyancy to overcome the resistance to upward motion imparted by the pressurized cylinder assembly 2 thereby keeping the float 1 immobile such that high waves wash over it.

It will be understood that modifications can be made in the embodiments of the invention described herein.

The embodiments of the invention in which an exclusive property or privilege is claimed are defined as follows:

1. Wave energy conversion systems that are comprised of a float with a single connection to the seabed via a hydraulic cylinder wherein the hydraulic cylinder is caused to pump pressurized fluid up to the float by action of the float as the float moves in response to wave action and a float mooring connection and the float are configured to allow the float to move laterally oncoming waves to increase the amount of cylinder rod extension and thereby extract more energy from oncoming waves and a means to apply a restoring force to the float of wave energy conversion systems such that the float moves back its starting position after a wave has passed to be ready to receive the next oncoming wave.

2. A wave energy conversion system that is comprised of a float with a single connection to the seabed via a hydraulic cylinder wherein the hydraulic cylinder is caused to pump pressurized fluid down to a piping system fixed to the seabed by action of the float as the float moves in response to wave action and a float mooring connection and the float are configured to allow the float to move laterally oncoming waves to increase the amount of cylinder rod extension and thereby extract more energy from oncoming waves and a means to apply a restoring force to the float of wave energy conversion systems such that the float moves back its starting position after a wave has passed to be ready to receive the next oncoming wave.

3. A wave energy conversion system as claimed in claim 1 wherein the float is generally a closed rectangular tube with rounded corners.

4. A wave energy conversion system as claimed in claim 2 wherein the float is generally a closed rectangular tube with rounded corners.

5. Wave energy conversion systems as claimed in claim 1 wherein the fluid under pressure is received by the float and the fluid pressure energy is transformed to another form such as heat, mechanical, and/or electrical energy by components installed inboard the float.

6. Wave energy conversion systems as claimed in claim 2 wherein the fluid under pressure is received by a piping system affixed to the seabed and transported to shore where the fluid pressure energy is transformed to another form such as heat, mechanical, and/or electrical energy by components installed onshore.

7. Wave energy conversion systems as claimed in claim 1 provided with a convenient means to allow remotely detaching the cylinder/float assembly from its seabed anchor without the use of divers to permit towing the complete system to a port for maintenance servicing and similarly reattaching after maintenance servicing has been completed.

8. Wave energy conversion systems as claimed in claim 2 provided with a convenient means to allow remotely detaching the cylinder/float assembly from its seabed anchor without the use of divers to permit towing the complete float/cylinder assembly to a port for maintenance servicing and similarly reattaching after maintenance servicing has been completed.

9. Wave energy conversion systems as claimed in claim 1 is controlled by an adaptive control system that senses the sea state at any particular time and correspondingly adjusts the level of resistance the hydraulic cylinder applies to the float as it tries to move generally upward and laterally due to wave action in such a way that optimum energy is extracted from oncoming waves.

10. Wave energy conversion systems as claimed in claim 2 is controlled by an adaptive control system that senses the sea state at any particular time and correspondingly adjusts the level of resistance the hydraulic cylinder applies to the float as it tries to move generally upward and laterally due to wave action in such a way that optimum energy is extracted from oncoming waves.

11. Wave energy conversion systems as claimed in claim 1 wherein some of the pressurized fluid delivered by the float/cylinder system in response to a passing wave is stored in a hydraulic accumulator and subsequently is allowed to flow out at controlled rates to energy conversion components such that the accumulator is nearly empty when fluid begins to again flow into the accumulator in response to the next oncoming wave.

12. Wave energy conversion systems as claimed in claim 2 wherein some of the pressurized fluid delivered by the float/cylinder system in response to a passing wave is stored in a hydraulic accumulator and subsequently is allowed to flow out at controlled rates to energy conversion components such that the accumulator is nearly empty when fluid begins to again flow into the accumulator in response to the next oncoming wave.

13. Wave energy conversion systems as claimed in claim 11 wherein an adaptive control system manages release of stored energy from each wave in such a way that a constant rate of energy delivery is maintained over each wave cycle.

14. Wave energy conversion systems as claimed in claim 11 wherein an adaptive control system manages release of stored energy from each wave in such a way that a constant rate of energy delivery is maintained over each wave cycle.

15. The wave energy conversion systems as claimed in claim 1 are provided with a means to apply sufficiently high pressure to the hydraulic cylinder such that the net float buoyancy is insufficient to overcome the hydraulic cylinder's resistance thereby forcing the float to remain at an essentially constant elevation when the float encounters extremely large storm waves allowing the more violent portion of the wave to pass over the float.

16. The wave energy conversion systems as claimed in claim 2 are provided with a means to apply sufficiently high pressure to the hydraulic cylinder such that the net float buoyancy is insufficient to overcome the hydraulic cylinder's resistance thereby forcing the float to remain at an essentially constant elevation when the float encounters extremely large storm waves allowing the more violent portion of the wave to pass over the float.

17. An adaptive control system applied to wave energy conversion systems as claimed in claim 1 such that the amount of restoring force is adjusted to minimize the amount of energy used to bring the float back to its starting position as a function of the sea state at any particular time.

18. An adaptive control system applied to wave energy conversion systems as claimed in claim 2 such that the amount of restoring force is adjusted to minimize the amount of energy used to bring the float back to its starting position as a function of the sea state at any particular time.

19. Use of a variable displacement hydraulic motor to convert fluid pressure energy to mechanical energy in the wave energy conversion systems claimed in claim 1.

20. Use of a variable displacement hydraulic motor to convert fluid pressure energy to mechanical energy in the wave energy conversion systems claimed in claim 2.

21. The ends of floats used in energy conversion systems as claimed in claim 3 are angled somewhat to face oncoming waves.

22. The ends of floats used in energy conversion systems as claimed in claim 4 are angled somewhat to face oncoming waves.

23. A number of energy conversion systems as claimed in claim 1 controlled by a single adaptive controller located on one of the floats or located remotely on an independent structure or onshore.

24. A number of energy conversion systems as claimed in claim 2 controlled by a single adaptive controller located on one of the floats or located remotely on an independent structure or onshore.

25. A number of wave energy conversion systems as claimed in claim 2 arranged to deliver pressurized fluid to a common energy conversion facility.

26. A number of energy conversion systems as claimed in claim 2 controlled by a single adaptive controller located on one of the floats or located remotely on an independent structure or onshore.

27. The pressurized fluid as claimed in claim 1 is conducted to the float via a hollow piston rod connected to the float.

28. The pressurized fluid as claimed in claim 2 is conducted to the float via a hollow piston rod connected to the float.

* * * * *